United States Patent [19]
Fredriksson et al.

[11] Patent Number: 5,590,997
[45] Date of Patent: Jan. 7, 1997

[54] BOAT TRAILER DEVICE

[75] Inventors: Mattias Fredriksson, Kalmar; Martin Altnäs, Västervik, both of Sweden

[73] Assignee: Swedish Mercoring HB, Kalmar, Sweden

[21] Appl. No.: 397,071

[22] PCT Filed: Sep. 9, 1993

[86] PCT No.: PCT/SE93/00733

§ 371 Date: Jun. 13, 1995

§ 102(e) Date: Jun. 13, 1995

[87] PCT Pub. No.: WO94/06650

PCT Pub. Date: Mar. 31, 1994

[30] Foreign Application Priority Data

Sep. 11, 1992 [SE] Sweden ................... 9202615

[51] Int. Cl.⁶ ..................... B60P 3/10
[52] U.S. Cl. ........... 414/541; 414/539; 414/546; 414/569; 114/344; 280/414.1; 254/325; 405/1
[58] Field of Search ............ 414/482, 486, 414/487, 491, 494, 501, 506, 538, 539, 540, 546, 559, 560, 462, 569, 542, 521, 541; 280/414.1, 414.3; 114/258, 366, 369, 344; 405/1; 254/389, 393, 325, 407, 413, 326, 327

[56] References Cited

U.S. PATENT DOCUMENTS

| | | |
|---|---|---|
| 2,058,473 | 10/1936 | Le Tourneau ............ 414/569 X |
| 2,557,580 | 6/1951 | Summers . |
| 2,571,361 | 10/1951 | Harmanson ............ 114/344 X |
| 2,834,492 | 5/1958 | Roy, Sr. et al. . |
| 3,132,758 | 5/1964 | Linton ............ 414/569 X |
| 3,180,622 | 4/1965 | Fillion ............ 414/569 X |
| 3,764,020 | 10/1973 | Batson ............ 414/559 X |

FOREIGN PATENT DOCUMENTS

| | | | |
|---|---|---|---|
| 940489 | 1/1974 | Canada ............ | 414/569 |
| 963732 | 5/1957 | Germany ............ | 414/559 |
| 130171 | 10/1978 | U.S.S.R. ............ | 414/560 |
| 1092614 | 11/1967 | United Kingdom . | |

*Primary Examiner*—Frank E. Werner
*Attorney, Agent, or Firm*—Dvorak and Traub

[57] ABSTRACT

The present invention relates to a device at a trailer, especially a boat trailer, which includes a chassis supported by wheels and a coupling device in the front for connecting the trailer to a towing vehicle. A two-armed lever consists of arms which form an angle with each other and is pivoted in an axis of rotation which is oriented transversely at the back of the trailer. The first arm of the lever, which mainly points forward from the axis of rotation has a length that exceeds or falls below the length of the other arm of the lever. The two lever-arms comprise parallel arm elements, whose ends are connected to the ends of the axis of rotation and which at their outer ends are lined by transversal beams. A winch tower with a winch is provided at the front end of the trailer. The wire of the winch is adapted to run over the outer ends of the lever-arms and in its end is provided with lifting devices for the objects.

16 Claims, 6 Drawing Sheets

FIG. I

BOAT TRAILER DEVICE

BACKGROUND OF THE INVENTION

The present invention relates to a trailer device including a chassis supported by wheels, a coupling device in the front of the trailer for connecting the trailer to a towing vehicle, and a winch to facilitate movement of an object along the trailer. In particular the invention relates to the trailer utilized as a lifting device for a boat.

When loading and unloading a trailer, in most cases it is necessary to move heavy objects vertically as well as horizontally to and from the trailer. If the object is heavy, access to a lifting device or assistance from other persons is usually required to perform the vertical movement. This leads to essential limitations with respect to the usefulness of the trailer.

At launching and loading of pleasure-boats it is common practice to make use of a special boat trailer and a slanted ramp by means of which the trailer can be driven down into and out of the water. As a result of this procedure the most sensitive components on the boat trailer are lowered into the water, possibly causing corrosion damage. Furthermore, at least two persons are usually necessary. When launching and loading a boat utilizing the prior art boat trailer and a ramp. One person is usually necessary to handle the towing vehicle and the boat trailer and another person is necessary in the boat.

SUMMARY OF THE INVENTION

The aim of the present invention is to provide a trailer device which eliminates said inconveniences and which can be operated by one person; particularly launching and loading of a boat from a quay, a pier or the like. In accordance with the invention, this aim is obtained in that the device comprises a lever having a first and second arm, whose arms form an angle with respect to each other and are pivoted at an axis of rotation which is oriented transversally at the back of the trailer. The first arm of the lever, which mainly points forward from the axis of rotation. has a length that exceeds or falls below the length of the other arm of the lever. Parallel arm elements comprise the first and second arms whose ends are connected to the ends of the axis of rotation and which at their outer ends are linked by transversal beams, at which the distance between the outer ends of the first arm exceeds or falls below the distance between the outer ends of the second arm and limits the width of the objects that can be loaded onto or off of the trailer. A winch tower with a winch is provided at the front end of the trailer, whereby the wire of the winch is adapted to run over the outer ends of the first and second arms and at one end is provided with lifting means for the object. The device also includes means adapted to prevent motion between the first and second arms and the wire during predetermined stages of the loading or unloading of the object.

To prevent motion during the predetermined stages of loading or unloading of the object, the transversal beam is provided with a block through which the wire runs, which locks the wire in one direction and allows it to run in the other. Alternatively, to prevent motion during the predetermined stages, the transversal beam is cylindrical and pivoted in the outer ends of the arm elements. The wire is guided at least one turn around the cylindrical transversal beam and the motion prevention means comprises a cotter pin that slides into the cylindrical transversal beam from the arm element to prevent the rotation of the beam.

In accordance with another characteristic feature of the invention, the trailer device includes a second winch, which facilitates loading and unloading of the trailer device especially when it is to be performed by one person. The second winch has a wire adapted to be connected to one end of the object and which is adapted to pull the object forward when it is to be placed on the chassis, whereafter the wire of the first winch is loosened.

In accordance with another characteristic feature of the invention, the second arm of the lever can be lowered against the front end of the trailer when the arm is not used for lifting in a transportation state. The transportation state refers to the trailer device in a fully collapsed stage wherein the trailer device is not carrying an object or boat.

To facilitate the raising and lowering of the two arms of the lever, these arms are provided with elastic means which reduce the manual force required to extend the lever.

According to another characteristic feature for the invention, the second arm of the lever is formed as part of the frame of the trailer, which in a transportation state is fixed to the chassis of the trailer.

To facilitate the loading and unloading of the trailer the axis of rotation is placed behind the trailer platform and is vertically positioned so that the upper part of the axis lies substantially in the plane of the platform.

Furthermore, the lifting device can be connected to a dynamometer, which directly measures the weight of the object.

According to the invention, full security from tilting of the trailer during loading or unloading and from damages on the towing device for the towing vehicle as well as on the corresponding coupling device on the trailer is assured in that the device comprises at least one support leg, which is mounted at the back of the chassis and can be turned down or turned up. In another embodiment this support leg is detachably mounted.

According to a final characteristic feature of the invention, said device is placed on a boat trailer.

DETAILED DESCRIPTION OF THE DRAWINGS

In the following detailed description the invention will be explained with reference to the following drawings wherein.

DETAILED DESCRIPTION OF THE INVENTION

Figure 1:
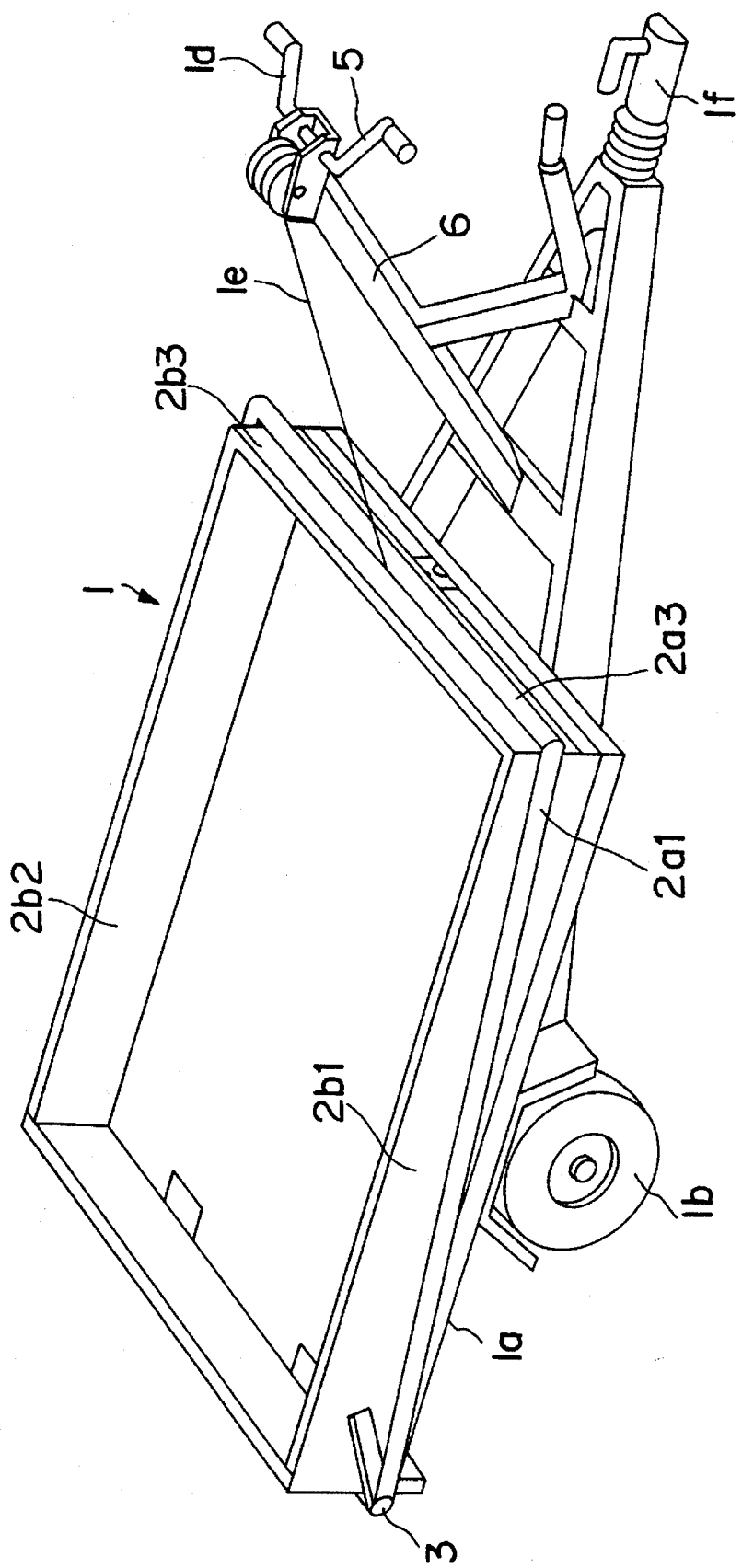
FIG. 1 is a perspective view of the invention in a fully collapsed stage.

FIG. 1 generally shows a conventional trailer with a chassis $1a$, wheels $1b$ and a winch $1d$ whose wire $1e$ is coupled to an object and which is to be used for the transfer. The trailer is equipped with coupling means $1f$ of conventional type to couple the trailer to a motor vehicle with a towing device.

To facilitate the loading and unloading of objects, the trailer according to the invention is equipped with a device that comprises a lever 2, having a first arm 2a and a second arm 2b which can form an angle with respect to each other. Said angle exceeds a right angle and is preferably approximately 100°. The lever 2 is pivoted in an axis 3 which is mounted across the back of the chassis. The first arm 2a essentially extends forward from the axis 3 toward said coupling means 1f and has a length that differs from the length of the second arm 2b. Both arms are comprised of parallel arm elements 2a1, 2b1; 2a2, 2b2, which are connected to the ends of the rotation axis 3 and linked by transversal beams 2a3, 2b3 at their outer ends. The distance between the arm elements 2a1, 2b1 and 2a2, 2b2 limits the width of the objects for which the device can be used.

In the embodiment which is shown in the drawing, the angle between the arms is determined by a rod 2ab, which is detachably mounted between the arms 2a and 2b. The center of gravity of the trailer can be displaced by a variation of this angle.

The winch 1d is in many cases satisfactory for the handling of an object when loading and unloading a trailer and in particular when launching and loading a boat, but in the following it will be apparent that it is favorable to use an additional winch, as is shown in the drawing. The wire 1e of the winch 1d runs across the transversal beams 2a3, 2b3 at the outer ends of the lever arms 2a, 2b and has lifting eye bolts 7e2 at the end.

In accordance with the invention, means to prevent relative motion between the lever arm 2b and the wire 1e during predetermined stages of launching or loading of a boat are provided for reasons which will be clear from the following.

Figure 2:
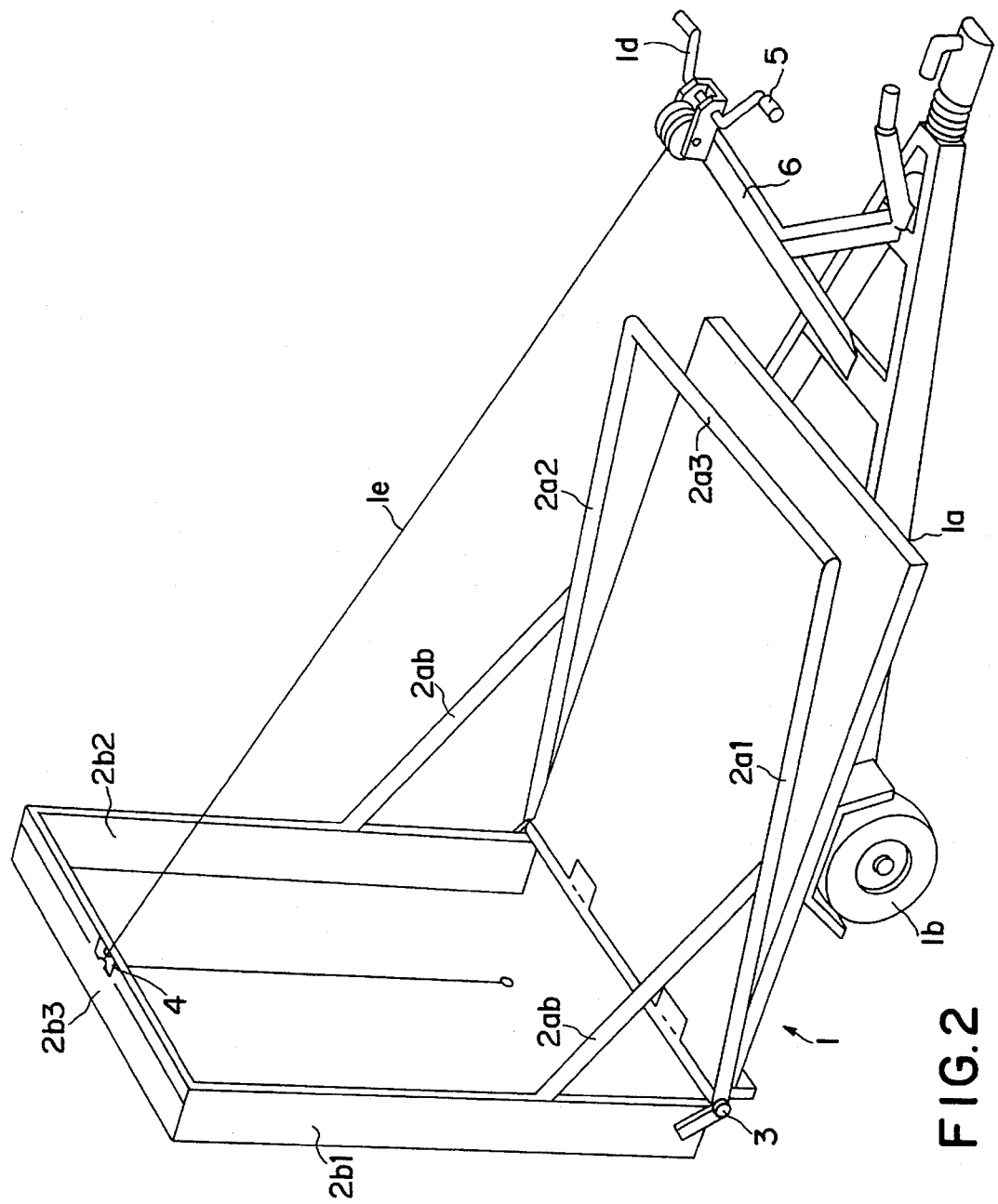
FIG. 2 is a perspective showing of the lever arm at one stage of loading or unloading with the device according to the invention mounted on a conventional trailer.
Figure 3:
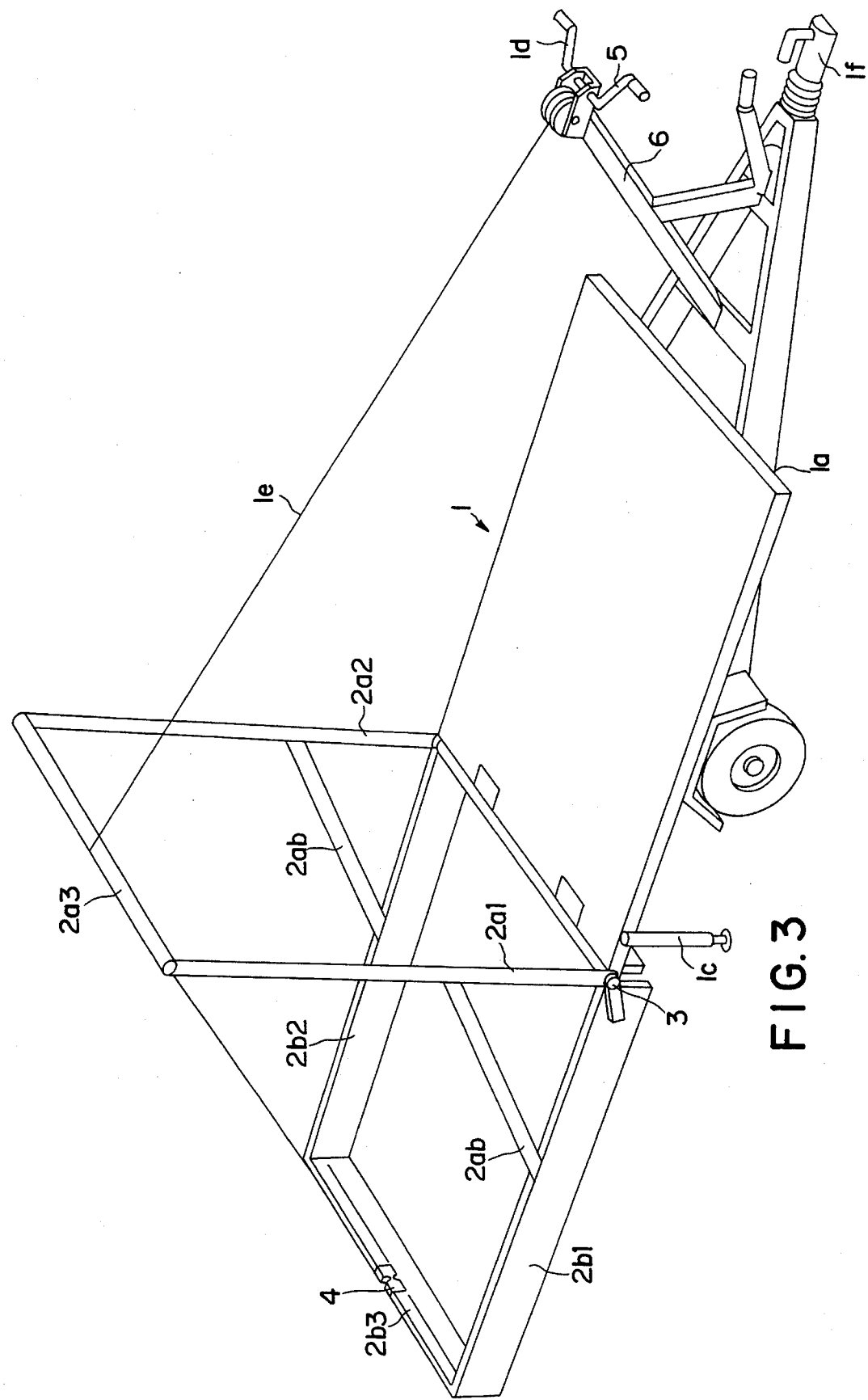
FIG. 3 is a perspective view showing the lever arm at a fully extended stage of loading or unloading.

In the embodiment according to FIG. 1 through FIG. 3, a block 4 is provided on the upper horizontal beam where the wire 1e runs on the lever arm 2b. The block allows the wire to run in one direction and locks the wire in the other direction so as to prevent the lever from moving in relation to the wire when this is not desired. In the embodiment shown in FIG. 4 through FIG. 6, the same function is achieved by a cylindrical and rotatably mounted transversal beam 10b3 mounted between arm elements 10b1 and 10b2. The wire 7e1 is guided at least one turn around the transversal beam 10b3. A cotter pin 10b4 is included that can be inserted from the second arm element 10b2 into the cylindrical beam 10b3 to prevent rotation of the beam. The relative motion must be possible again at a later stage.

To increase the stability at loading or unloading of an object, support legs 7c are provided at the back of the trailer, which support legs can be turned down, turned up, or can be detachably mounted.

Figure 4:
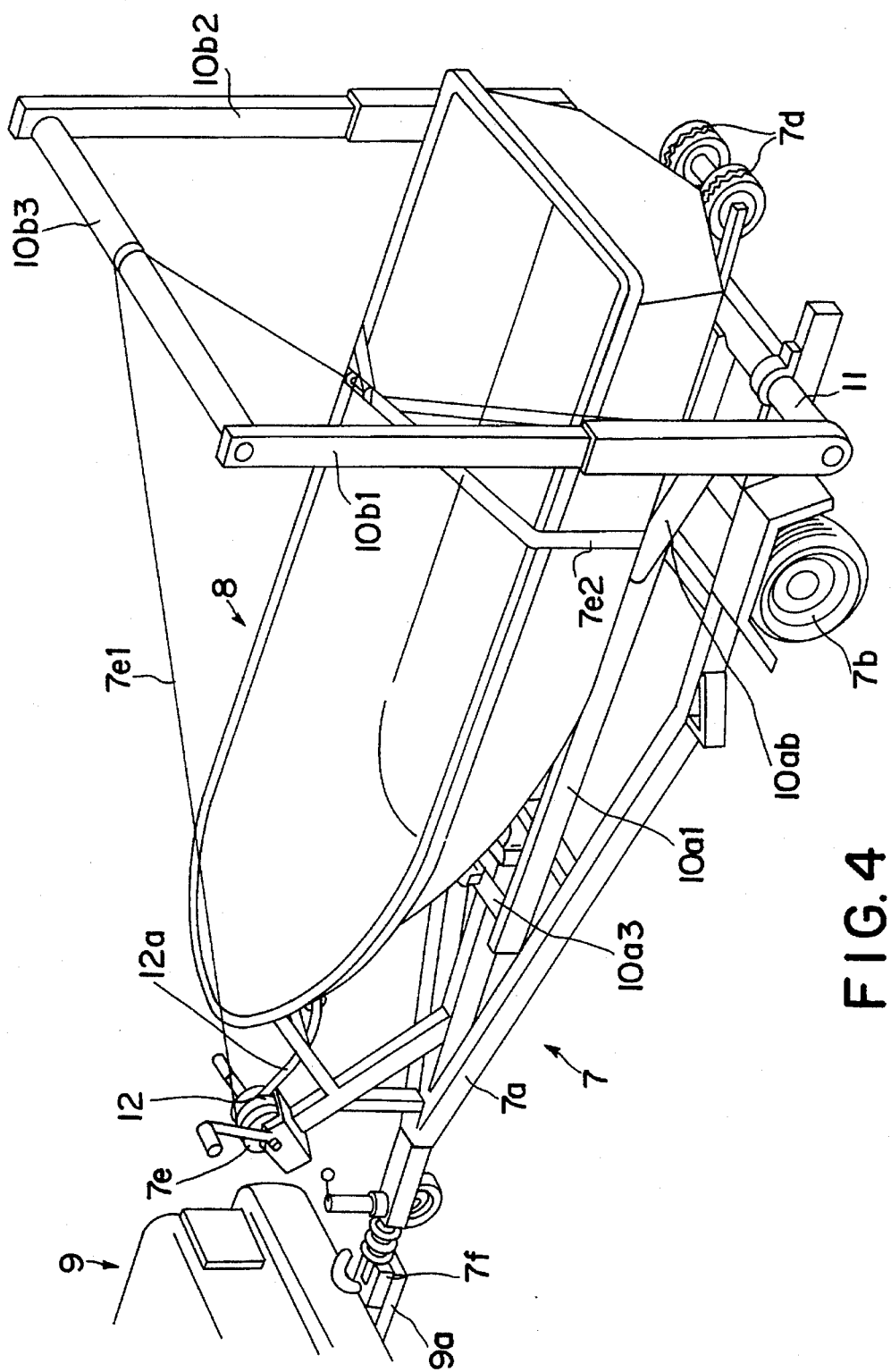
FIG. 4 shows a first stage of launching of a boat with the device according to the invention mounted on a boat trailer.
Figure 5:
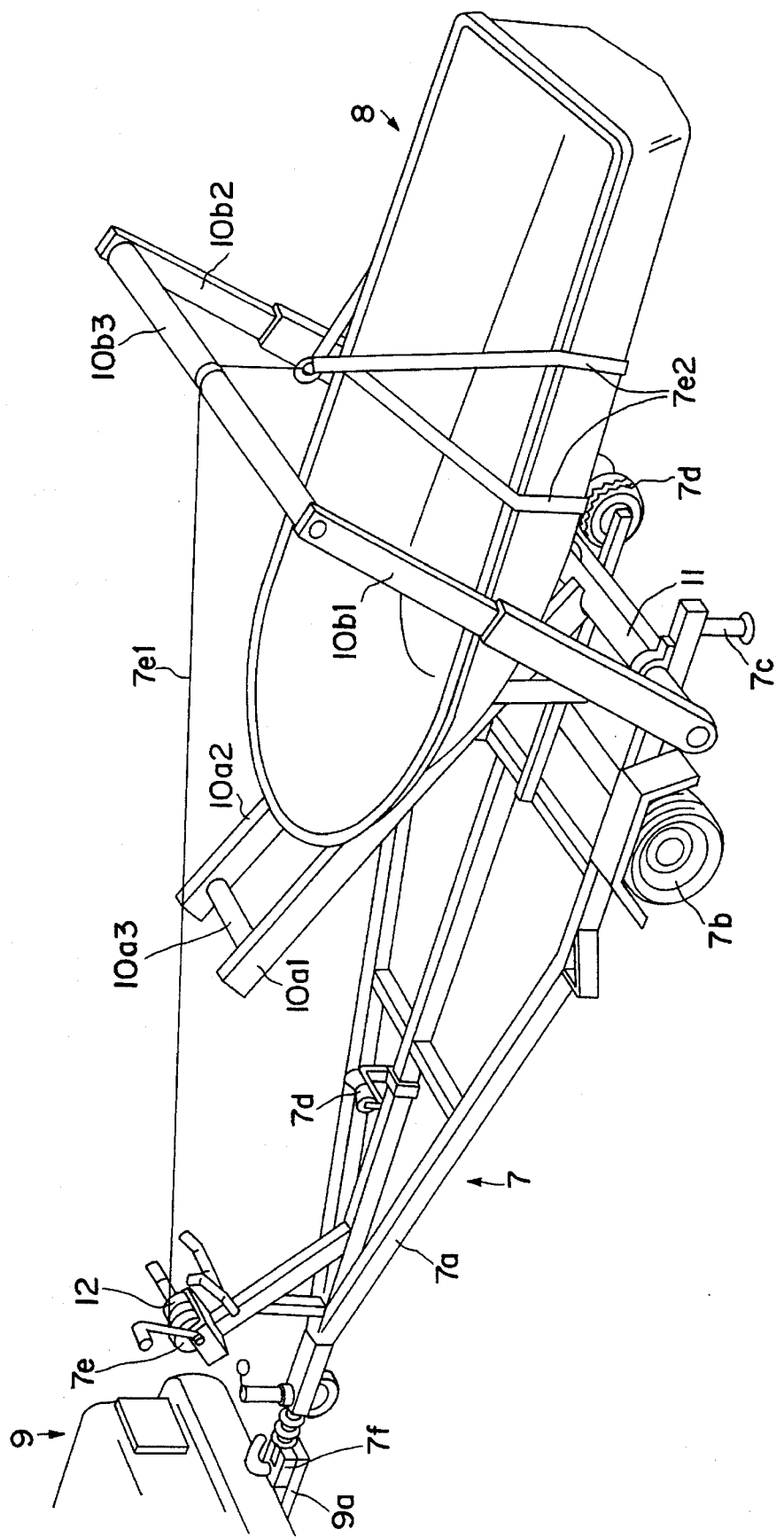
FIG. 5 shows a second stage of launching a boat with the device of the present invention.
Figure 6:
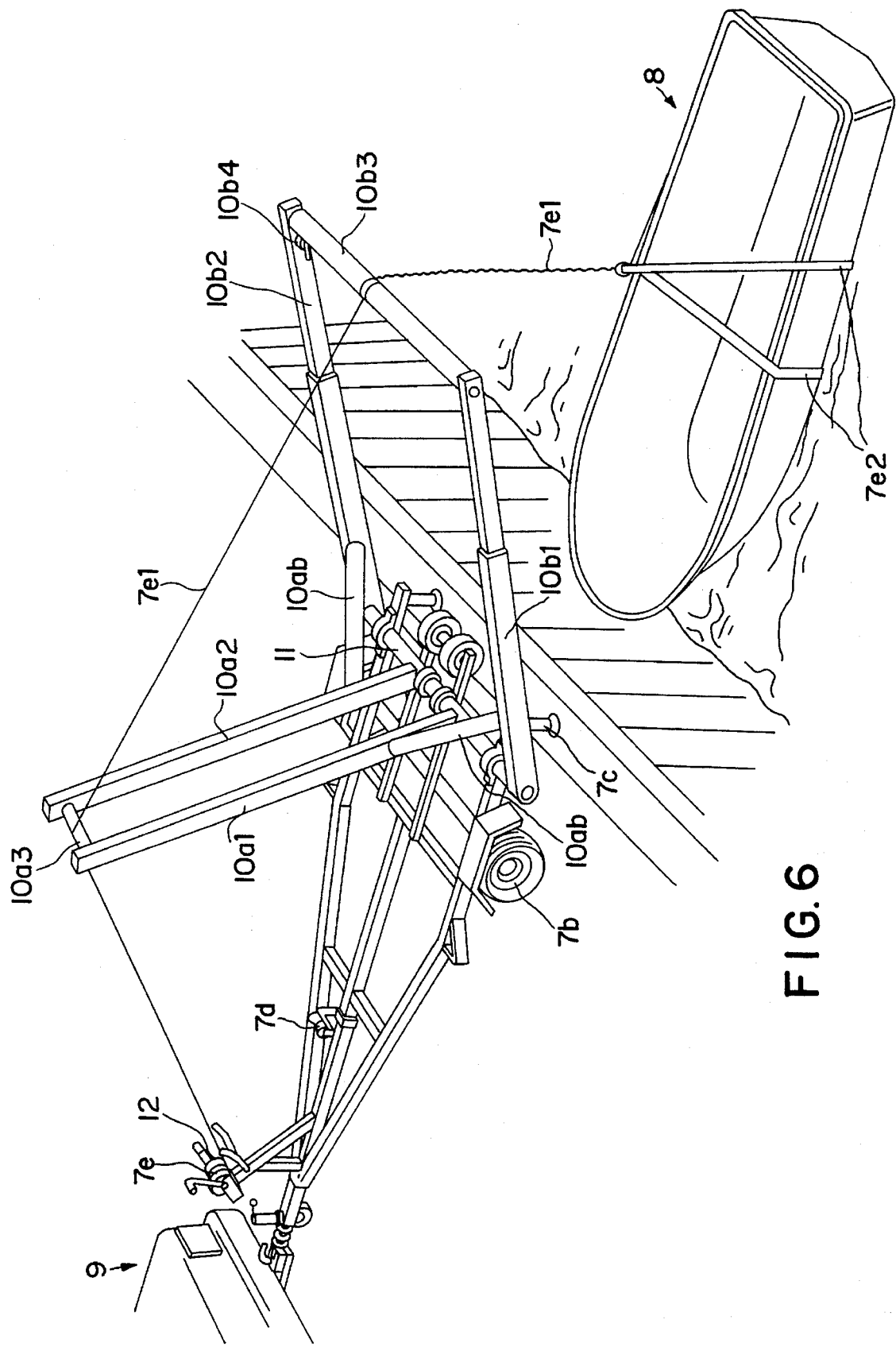
FIG. 6 shows a final stage of launching the boat of FIG. 5.

The following process of loading a boat onto the trailer will be explained in detail with reference to FIG. 4 through FIG. 6. The launching is accomplished in an analogous manner, but in a reversed order.

By means of the towing vehicle, the trailer 7 is parked as close as possible to the end of the quay or the pier. If the boat is a rowing boat, which is not very heavy, it is unnecessary to turn down the support legs 7c. In such a scenario, the towing vehicle 9 functions as the necessary counterweight.

When handling boats with motors, the support legs should always be turned down to prevent excessive strain on the towing device and the coupling device. When the arm elements are lowered, i.e. moving freely around the axis 11, the telescopically extendable arm elements 10b1, 10b2 are pulled out to such a length wherein the boat 8 goes free from the side of the quay or the pier when the lifting eye bolts 7e2 are applied at the center of gravity. In the embodiment shown in the drawing, the arm elements are manually pulled out and the telescopical arm elements can be locked in relationship to each other by means of a cotter pin. The arm is then raised and the rods 10ab are mounted. It is evident that other known solutions are possible, e.g. motor control, when it is not required for the arm 10b to be turned down.

When the crank of the winch is turned and the wire 7e1 is winched back onto the winch, the boat 8 is lifted out of the water. The wire 7e1 runs across the transversal beams 10a3, 10b3, and through a mechanical balancing, for which the angle between the first 10a and the second 10b lever arms is important; the second lever arm 10b is lifted while the first lever arm 10a is lowered. The angle is important since it eliminates the need to give the lifting device an initial push to make it pass the position of balance and thereby make the boat pass over the edge of the quay.

When the first arm 10a and the second arm 10b have about the same angle to the horizontal plane, it is suitable to prevent rotation of the transversal beam 10b3 by means of the cotter pin 10b4 to lock the wire 7e1 in relation to the beam. The mechanical balancing, which resulted in the lifting of the boat 8, then ceases. It is now also suitable to couple the wire 12a of the winch 12 to the stem of the boat 8 in order to control its movements when it is lifted over the boat trailer by the winching of the wire 7e1. This is accomplished by varying the angle to the horizontal plane for the arm elements 10b1, 10b2, wherein the angle is increased gradually while the corresponding angle for the lever arm 10a is decreased until the arm rests on the chassis 7a. The boat 8 is now drawn forward by means of the winch 12, while the tension in wire 7e1 is released so that the boat finally rests on the roller means 7d. Finally, the rods 7ab are released so that the arm 7b can be turned down and telescoped into the normal position. The loading is now finished and transportation can take place after the boat 8 has been tied up and the support legs 7c have been turned up.

We claim:

1. A trailer device for use on a trailer having a front and back end including a chassis supported by wheels and a coupling device located at the front of the trailer for connecting the trailer to a towing vehicle, comprising:

a lever having a first and second arm, which said first and second arms form an angle with respect to each other and are pivoted about an axis of rotation, said axis of rotation oriented transversally at the back end the trailer, at which the first arm of the lever points forward from the axis of rotation, the first arm having a length that exceeds a length of the second arm of the lever, the first and second arms comprised of parallel arm elements with ends, whose ends are connected to an end of the axis of rotation and which at their outer ends are linked to respective transversal beams, thereby the lever arms forming a "U" shape, a distance between the outer ends of the first arm exceeds a distance between the outer ends of the second arm, said distance between ends limiting the width of objects that can be loaded or unloaded from the trailer, the front end of the trailer including a winch tower and a winch, whereby a wire of the winch is adapted to run over the outer ends of the first and second arms, one end of the wire provided with lifting means for attachment to the object, said first and second arms also including means adapted to prevent motion between the first and second arms and the wire during predetermined stages of the loading or unloading of the object.

2. Device in accordance with claim 1, characterized in that the transversal beam of the second ever (2b) is provided with a block (4) through which the wire (1e) runs, which locks the wire in one direction and allows it to run in another direction or in that the transversal beam (10b3) of the second lever is cylindrical and pivoted in the outer ends (10b1, 10b2) of the arms elements, in that the wire (7e1) is guided at least one turn around the cylindrical beam (10b3) and in that said device comprises a cotter that slides in the cylindrical beam (10b3) from the arm element to prevent the rotation of said beam.

3. Device in accordance with claim 1, characterized in that it comprises a second winch (5), whose wire is adapted no be connected to one end of the object and which is adapted to pull the object forward when it is to be placed on the chassis (1a), whereafter the wire (1e) of the first recited winch (1d) is loosened.

4. The trailer device of claim 1, wherein the "U"-shaped first arm of the lever for a transportation state can be turned down against the front end of the trailer, the second arm of the lever for a transportation state can be turned down against the front end of the trailer and positioned within the "U"-shape of the first arm of the lever.

5. Device in accordance with claim 1, characterized in that the arms (2a, 2b) of the lever are provided with elastic means to facilitate the transformation from transportation state to a lifting state.

6. The trailer device of claim 1, wherein the length of the lever-arms exceeds the length of the trailer and the distance between the parallel arm elements of the first and second arms exceeds the width of the trailer so that the first and second arms do not occupy any loading space in a transportation state.

7. The trailer device of claim 6, wherein the second arm of the lever forms a frame of the trailer and is fixed to the chassis of the trailer.

8. The trailer device of claim 7, wherein the axis of rotation is placed behind a trailer platform and vertically positioned so that an upper part of the axis lies substantially in the plane of the platform.

9. The trailer device of claim 8, wherein the lifting means are connected to a dynamometer.

10. The trailer device of claim 1, wherein the trailer device comprises at least one support leg, which can be turned down, turned up, or detachably attached to prevent excessive strain on the towing vehicle or the coupling device.

11. Device in accordance with claim 1, characterized in that the device is a boat trailer (10).

12. Device in accordance with claim 1 characterized in that the second arm (10b) is telescopically extendable.

13. The trailer device of claim 1, wherein the motion prevent means comprises:

a block provided on an upper horizontal beam through which the wire runs, said block locks the wire in a first direction and allows it to run in a second direction opposite to the first direction.

14. The trailer device of claim 1, wherein the motion prevent means comprises:

the transversal beam having a cylindrical shape and rotatably mounted between the parallel arm elements of the second arm;

the wire guided at least one turn around the cylindrical transversal beam;

a cotter pin inserted into the second arm and received into the cylindrical transversal beam to prevent rotation of the cylindrical transversal beam.

15. The trailer device of claim 1, wherein the motion prevent means in the transportation state can be turned down against the front end of the trailer.

16. The trailer device of claim 1, comprising a means for driving the winch.

* * * * *